(No Model.)
G. A. GRAPPOTTE.
WHIFFLETREE HOOK.
No. 588,328. Patented Aug. 17, 1897.
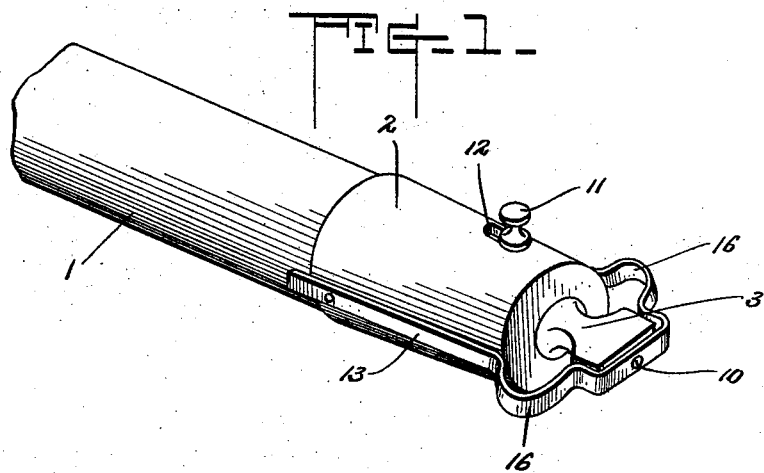
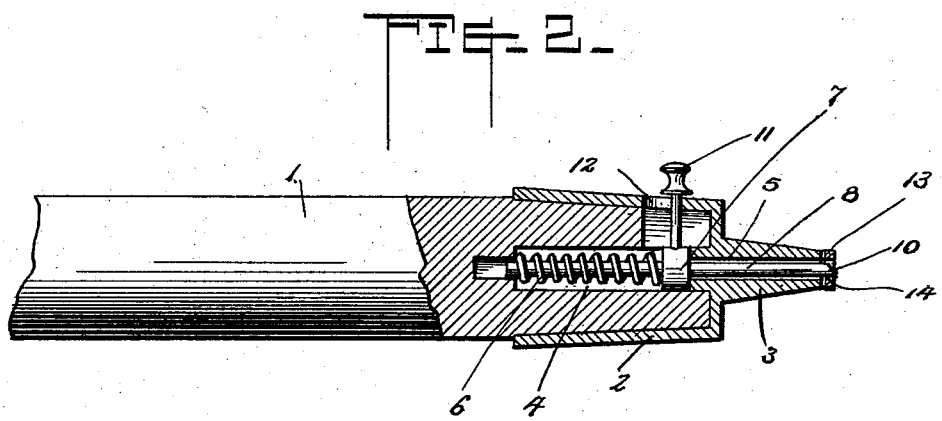
Witnesses:
Geo. A. Grappotte, Inventor:
Attorney.

UNITED STATES PATENT OFFICE.

GEORGE A. GRAPPOTTE, OF WATERTOWN, NEW YORK.

WHIFFLETREE-HOOK.

SPECIFICATION forming part of Letters Patent No. 588,328, dated August 17, 1897.

Application filed May 28, 1897. Serial No. 638,658. (No model.)

*To all whom it may concern:*

Be it known that I, GEORGE A. GRAPPOTTE, a citizen of the United States, residing at Watertown, in the county of Jefferson and State of New York, have invented certain new and useful Improvements in Whiffletree-Hooks; and I do declare the following to be a full, clear, and exact description of the invention, such as will enable others skilled in the art to which it appertains to make and use the same.

My invention has relation to whiffletree-hooks; and the object is to provide a device of this character which shall be simple of construction, durable in use, and comparatively inexpensive of production and by means of which all liability of the trace becoming accidentally disengaged is entirely obviated.

With this object in view the invention consists in certain features of construction and combination of parts, which will be hereinafter fully set forth.

In the accompanying drawings, Figure 1 is perspective view of a fragment of a whiffletree, showing my improved hook applied thereto; and Fig. 2 is a longitudinal sectional view.

In said drawings, 1 denotes a whiffletree, to each end of which is secured my improved hook. This hook consists of a sleeve 2, having projecting outwardly therefrom a headed stud 3. A spring-chamber 4 is formed in the sleeve and communicates with a bore 5, that extends through the headed stud.

6 denotes a spring seated in said chamber and pressing against the enlarged head 7 of a bolt 8, which projects through the bore of the headed stud. This bolt 8 is beveled on one edge, as shown at 10, for a purpose hereinafter to appear.

11 denotes a thumb-stud, which has its shank projecting through a longitudinal slot 12 in the sleeve portion and connected to the enlarged head of the bolt and by means of which the bolt may be retracted.

13 denotes a bail the free ends of which are pivoted to the sleeve and the bight or bail portion of which is provided with an aperture 14, adapted to receive the end of the bolt. The sides of the bail are formed with curved offsets 16 to allow for the width of the trace.

In operation the eye of the trace is slipped over the headed stud. The bail is now swung downward and engages the inclined end of the bolt, compresses the same, and when the hole in the bail arrives opposite the bolt the latter will spring out into the same, thus securely locking the bail in position and preventing the accidental disengagement of the trace from the headed stud.

Having thus described my invention, what I claim, and desire to secure by Letters Patent, is—

A whiffletree-hook, comprising a sleeve portion formed with a spring-chamber, a longitudinal slot communicating therewith, a headed stud having a bore communicating with said chamber, a pivoted bail having laterally-curved portions, and provided with a bolt-aperture, a spring seated in said chamber, a bolt adapted to the bore of the headed stud and provided with an enlarged head against which the spring presses, and a thumb-stud projecting through the longitudinal slot of the sleeve and engaging the head of the bolt, substantially as set forth.

In testimony whereof I hereunto affix my signature in presence of two witnesses.

GEORGE A. GRAPPOTTE.

Witnesses:
F. B. RICE,
ELMER E. WORTHEIR.